US012655070B2

(12) United States Patent
Sidheswaran et al.

(10) Patent No.: US 12,655,070 B2
(45) Date of Patent: Jun. 16, 2026

(54) STABLE MICRONUTRIENT COMPLEX FOR USE IN AGRICULTURAL APPLICATIONS

(71) Applicant: WinField Solutions, LLC, Arden Hills, MN (US)

(72) Inventors: Meera Sidheswaran, Woodbury, MN (US); Catherine White, River Falls, WI (US); Sridhar Mannem, Hudson, WI (US); Dustyn Sawall, New Richmond, WI (US); Danny Brown, Woodbury, MN (US)

(73) Assignee: WinField Solutions, LLC, Arden Hills, MN (US)

( * ) Notice: Subject to any disclaimer, the term of this patent is extended or adjusted under 35 U.S.C. 154(b) by 562 days.

(21) Appl. No.: 18/161,356

(22) Filed: Jan. 30, 2023

(65) Prior Publication Data

US 2023/0242459 A1 Aug. 3, 2023

Related U.S. Application Data

(60) Provisional application No. 63/305,891, filed on Feb. 2, 2022.

(51) Int. Cl.
*C05D 9/02* (2006.01)
*C05G 3/60* (2020.01)

(52) U.S. Cl.
CPC *C05D 9/02* (2013.01); *C05G 3/60* (2020.02)

(58) Field of Classification Search
CPC .................................. C05D 9/02; C05G 3/60
See application file for complete search history.

(56) References Cited

U.S. PATENT DOCUMENTS

| | | | |
|---|---|---|---|
| 5,504,055 | A | 4/1996 | Hsu |
| 5,997,600 | A | 12/1999 | Dean |
| 7,166,688 | B1 | 1/2007 | Dean |
| 9,908,821 | B2 | 3/2018 | Brown et al. |
| 9,938,201 | B1 * | 4/2018 | Scott ..................... A01N 59/16 |
| 2018/0215674 | A1 | 8/2018 | Scott et al. |

| | | | |
|---|---|---|---|
| 2020/0062667 | A1 | 2/2020 | Mclaughlin et al. |
| 2020/0385318 | A1 | 12/2020 | Scott et al. |
| 2021/0230082 | A1 * | 7/2021 | Selby-Pham ............ C05G 5/23 |

OTHER PUBLICATIONS

International Search Report and Written Opinion issued in International Application No. PCT/US2023/061539, mailed on Apr. 14, 2023, 9 pages.
International Preliminary Report on Patentability issued in International Application No. PCT/US2023/061539, mailed on Aug. 15, 2024, 7 pages.
MicroSync Complete, Product label, revised Feb. 2018, Verdesian Life Sciences, LLC, Cary, NC.
PolyAmine Boron, Product label, revised Jul. 2016, Verdesian Life Sciences, LLC, Cary, NC.
"AgriSolutions™, Max-In® for Cotton NF", Product Label, Jul. 2, 2012, WinField Solutions LLC, St. Paul, MN.
"AgriSolutions™, Max-In® Vine & Vegetable", Product label, Apr. 22, 2009, WinField Solutions, LLC, St. Paul, MN.
"Symbol™/Release; enhanced Foliar Liquid Micronutrients to Aid in Recovery From Crop Stresses", Product label, Dec. 19, 2018, WinField Solutions, LLC, St. Paul, MN.
"Symbol™/Release; enhanced Foliar Liquid Micronutrients to Aid in Recovery From Crop Stresses", Product label, Sep. 20, 2017, WinField Solutions, LLC, St. Paul, MN.

* cited by examiner

*Primary Examiner* — Sahana S Kaup
*Assistant Examiner* — Toriana N. Vigil
(74) *Attorney, Agent, or Firm* — Dorsey & Whitney LLP

(57) ABSTRACT

An agricultural admixture includes an acid, an organic amine, boron and one or more additional micronutrients, in which the boron and additional micronutrients are chelated, along with a saccharide. In the admixture, boron is present in an amount of at least 1.0 wt % thereof, the admixture contains a total boron and additional micronutrients content of at least 7.2 wt %, and the admixture remains stable, non-precipitated for at least 60 days. A method of spraying an agricultural admixture involves admixing the aforementioned admixture with one or more agricultural chemicals and spraying the admixture, where the admixture remains stable, non-precipitated for at least 60 days. A method of producing an agricultural admixture involves admixing the aforementioned admixture with one or more agricultural chemicals, where the admixture remains stable, non-precipitated for at least 60 days.

18 Claims, No Drawings

STABLE MICRONUTRIENT COMPLEX FOR USE IN AGRICULTURAL APPLICATIONS

CROSS REFERENCE TO RELATED APPLICATIONS

This application claims priority to U.S. Provisional Patent Application No. 63/305,891, filed Feb. 2, 2022, entitled "STABLE MICRONUTRIENT COMPLEX FOR USE IN AGRICULTURAL APPLICATIONS" which is incorporated by reference herein, in the entirety and for all purposes.

TECHNICAL FIELD

The present disclosure relates to products, systems and methods of using micronutrient compositions in seed, soil, foliar and fruit applications, and more particularly to improving the stability of micronutrient compositions containing elevated micronutrient levels for plant uptake in such applications.

BACKGROUND

Herbicides, insecticides, fungicides, collectively known as pesticides, function to protect crops by controlling the growth of weeds, harmful insects and combatting plant diseases that afflict crops. Without application of herbicides, food production would decline, many fruits and vegetables would be in short supply, and the price of food would rise. Further, fibers for textile manufacturing, such as cotton, would decrease as farmers would lose their harvests due to pests and diseases.

Pesticides are typically applied in combination with adjuvants to improve pesticide performance. Adjuvants are substances in a pesticide formulation or added to the spray tank to improve pesticidal activity or application characteristics. In addition, micronutrients may be applied in combination with pesticides and adjuvants. Micronutrients includes elements essential for plant growth and include boron (B), copper (Cu), iron (Fe), chloride (Cl), manganese (Mn), molybdenum (Mo) and zinc (Zn). For instance, boron assists plants in use and regulation of other nutrients, aids production of sugar and carbohydrates, and is required for seed and fruit development. Copper is important for reproductive growth, aids in root metabolism and helps in the utilization of proteins. Chloride aids plant metabolism. Iron is a necessary micronutrient in the formation of chlorophyll. Manganese is used by plant enzyme systems and is involved in the breakdown of carbohydrates, as well as nitrogen metabolism. Molybdenum assists in the use of nitrogen. Zinc is needed by the plant for regulating plant growth and in carbohydrate and sugar metabolism. While micronutrients are found in soil, available quantities may not be at levels sufficient for plant growth.

However, many pesticides contain components such as phosphate salts or impurities that bind to the metal ions of the micronutrient and convert them to insoluble solids before the micronutrient can be absorbed by the plant, rendering micronutrient ineffective. In prior approaches, ethylenediaminetetraacetic acid (EDTA) has been used as a chelating compound that operates to bind metal ions of the micronutrient and prevents phosphate salt from converting the micronutrients to insoluble solids. While EDTA prevents phosphate from binding to metal ions, the metal ions exhibit diminished reactivity and the EDTA can cause phytotoxicity. In addition, EDTA is not accepted for use as a chelator in all countries.

SUMMARY

The stable micronutrient compositions provided herein contain elevated micronutrient levels available for plant uptake and may be applied in soil, seed, soil, foliar and fruit applications.

In some implementations, an agricultural admixture includes an acid, an organic amine, boron and one or more additional micronutrients, in which the boron and additional micronutrients are chelated, along with a saccharide. In the admixture, boron is present in an amount of at least 1.0 wt % thereof, the admixture contains a total boron and additional micronutrients content of at least 7.2 wt %, and the admixture remains stable, non-precipitated for at least 60 days.

In various implementations and alternatives, boron may be present in an amount of up to 3.0 wt % of the admixture, the total of the boron and the additional micronutrients content may be up to about 10.2 wt %, and/or additional micronutrients may additionally include one or more of zinc, manganese, copper, iron, molybdenum, magnesium, or calcium. For instance, additional micronutrients may include two or more of the enumerated additional micronutrients. In a particular example, additional micronutrients include zinc and manganese. Where zinc is the additional micronutrient, zinc may be present at about 2.2 to 5.0 wt % of the admixture, and/or where manganese is the additional micronutrient, the manganese may be present at about 2.0 to 5.0 wt % of the admixture. The saccharide may include one or more monosaccharaides, disaccharides, polysaccharides, or oligosaccharides, and where the saccharide includes monosaccharaides, the monosaccharaides may include fructose and glucose. The admixture may additionally include alkylpolyglucoside, sulfuric acid, a multidentate organic acid such as citric acid, glutamic acid, or combinations thereof, and/or a defoamer. The organic amine may include an amino alcohol, such as one or more of monoethanolamine, diethanolamine, and/or triethanolamine.

In other implementations, a method of spraying an agricultural admixture involves admixing an admixture comprising an acid, an organic amine, boron and additional micronutrients, and a saccharide with a pesticide. Then spraying the admixture. In the admixture, the acid and the organic amine may chelate with the boron and the additional micronutrients to thereby prevent the boron and the additional micronutrients from forming an insoluble solid, the boron may be present in an amount of at least 1.0 wt % of the admixture, the admixture may contain a total boron and additional micronutrients content of at least 7.2 wt %, and the admixture may remain stable, non-precipitated for at least 60 days.

In various implementations and alternatives, the pesticide may include one or more of 2,4-Dichlorophenoxyacetic acid, glyphosate, glufosinate, and dicamba.

In further implementations, a method of producing an agricultural admixture involves admixing an admixture of an acid, an organic amine, boron and additional micronutrients, and a saccharide with one or more agricultural chemicals, wherein the boron is present in an amount of at least 1.0 wt % of the admixture, the agricultural admixture contains a total boron and additional micronutrients content of at least 7.2 wt %, the acid and the organic amine chelate with the boron and the additional micronutrients to thereby prevent the boron and the additional micronutrients from forming an insoluble solid, and the admixture remains stable, non-precipitated for at least 60 days.

In various implementations and alternatives, the agricultural chemicals may include at least one of: one or more pesticides; one or more fertilizers; one or more adjuvants; or one or more chemicals capable of precipitating with the boron and additional micronutrients in the absence of the acid and the organic amine.

DETAILED DESCRIPTION

Implementations of the present disclosure provide stable agricultural compositions containing elevated levels of micronutrients developed in part from the Examples of the present disclosure as well as related experimentation. The compositions may be aqueous-based and suitable for application on one or more agricultural substrates such as seed, soil, foliage, or fruit. The compositions may be tank mixed and compatible with a variety of herbicides, insecticides, fungicides, agricultural adjuvants as well as other agricultural products that may contain components capable of precipitating with micronutrients. For instance, the compositions may promote tank mix compatibility and improve spray characteristics while simultaneously providing elevated levels of micronutrients.

Elevated micronutrients levels in the compositions may be at levels of about 7.0 to 12.0 wt % of the composition, such as about 9.0 wt %, about 7.2 wt % and/or up to about 10.2 wt % of the composition, or about, up to about, or at least about 7.0, 7.25, 7.5, 7.75, 8.0, 8.25, 8.5, 8.75, 9.0, 9.25, 9.5, 9.75, 10.0, 10.2, 10.25, 10.5, 10.75, 11.0, 11.25, 11.5, 11.75, or 12.0 wt % of the composition. The micronutrients may include but are not limited to boron, zinc, manganese, copper, iron, molybdenum, magnesium, or calcium. In some implementations, the compositions may include two or more, three or more, four or more, or five or more micronutrients in combination and may be referred to as additional micronutrients. In an exemplary embodiment, the compositions may contain a combination of boron, zinc and manganese, and which may further include one or more of copper, iron, molybdenum, magnesium, and/or calcium The micronutrients may be derived from acids such as multidentate acids, from metal salts such as oxides, and from sulfates. The micronutrient levels expressed herein are elemental levels of the micronutrients.

Boron as a micronutrient may be present in an amount of at least 1.0 wt % of the stable agricultural compositions of the present disclosure, including about 1.0 to about 3.0, about 1.25 to about 3.0, about 1.5 to 3.0 wt %, or about, up to about, or at least about 1.1, 1.2, 1.3, 1.4, 1.5, 1.6, 1.7, 1.8, 1.9, 2.0, 2.1, 2.2, 2.3, 2.4, 2.5, 2.6, or 3.0 wt % of the composition. Boric acid may provide a source of boron for the composition, with boric acid having an elemental purity of boron of about 17.5%. It has surprisingly been found that the compositions of the present disclosure enable elevated levels of boron to be maintained in a stable, non-precipitated state, where such elevated levels may exceed 1.0 wt % when prior approaches only provide compositions with a maximum level of about 0.5 wt % due to the product otherwise becoming unstable. More specifically, and as provided herein, it has been discovered that a combination of acid(s), organic amines and one or more crystal inhibitors may facilitate maintaining high levels of boron in a stable solution at levels exceeding 1.0 wt %, and in some implementations exceeding about 1.5 wt %, or exceeding about 2.0 wt %; and in combination with an overall elevated level of micronutrients in solution such as at least 7.0 wt % and up to 12.0 wt %. The boron-containing agricultural compositions of the present disclosure may remain stable, non-precipitated for at least 30 days, 60 days, 100 days, 200 days, or 300 days, or about or at least about one year.

However, based on experiments conducted consistent with the Examples of the present disclosure, when too much boron is present in the composition, the compositions may become unstable. For instance, where boron is present at about 5.6% with a total micronutrient content with boron, zinc and manganese of 13.4 percent, the composition fails in 28 days or less.

Zinc as a micronutrient may be present at about 2.2 to 5.0 wt % of the stable agricultural compositions of the present disclosure, including about 2.2 wt %, about 2.3 to about 5.0 wt %, about 2.5 to about 4.5 wt %, about 3.0 to 4.5 wt %, about 3.0 to about 4.0 wt %, about 3.5 to about 4.5 wt %, about 4.0 to about 4.5 wt %, or about, up to about, or at least about 2.2, 2.3, 2.4, 2.5, 2.6, 2.7, 2.8, 2.9, 3.0, 3.25, 3.5, 3.75, 4.0, 4.25, 4.5, 4.75 or 5.0 wt % of the composition. Zinc may be provided in the form of zinc oxide (ZnO) or zinc citrate $(C_{12}H_{10}O_{14}Zn_3)$, zinc sulfate (ZnSO4), zinc nitrate $(ZnNO_3$ and zinc chloride (ZnCl), Zinc acetate $(Zn(CH_3COO)_2 \cdot 2H_2O)$ and for instance zinc oxide may have an elemental purity of zinc about 80.35%. In some implementations, the compositions of the present disclosure may be free of other forms of zinc such as zinc sulfate, zinc chloride, or zinc nitrate.

Manganese as a micronutrient may be present at about 2.0 to about 5.0 wt % of the stable agricultural compositions of the present disclosure, including about 2.5 to about 4.5, about 2.0 to about 4.0, about 2.75 to about 3.75, about 2.8 to about 3.4, about 2.75 to about 3.25, about 2.9 to about 3.2, or about, up to about, or at least about 2.0, 2.1, 2.2, 2.3, 2.4, 2.5, 2.6, 2.7, 2.7, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, or about 5.0 wt % of the composition. Manganese may be provided in the form of manganese sulfate $(MnSO_4)$ manganese oxide, manganese nitrate, manganese chloride, or manganese citrate. For instance manganese sulfate may have an elemental purity of manganese of about 36.4%. In some implementations, the pH of the agricultural composition may be about 6-9 where the source of manganese is derived from manganese oxide. In some implementations, the compositions of the present disclosure may be free of other forms of manganese such as manganese chloride and manganese nitrate.

In some implementations, the micronutrients in the stable aqueous compositions may include, consist of, or consist essentially of zinc, manganese and boron at the elevated levels disclosed herein. For instance zinc, manganese and boron may respectively account for about 4.0 wt %, 3.0 wt % and 2.0 wt % of the composition for a total micronutrient level at about 9.0 wt % of the composition. Within the micronutrients, zinc may account for about 40-50%, manganese may account for about 30-40, and boron may account for about 20-40% of the total micronutrients. In other examples, each of zinc, manganese and boron may account for 10-50%, 20-50%, 20-40%, 30-40%, 20-50%, or 30-50% of the total micronutrients and combinations thereof. In further examples, copper, iron, molybdenum, magnesium, and/or calcium may additionally be included in the micronutrients with one or more of zinc, manganese and boron to reach the elevated micronutrient levels disclosed herein.

Elevated micronutrient levels in the stable aqueous compositions of the present disclosure may be made possible by the combination of acids, one or more organic amines and one or more crystal inhibitors contained in the composition, which together may facilitate maintaining a stable, non-precipitated composition for about or at least about 30 days, 60 days, 100 days, 200 days, or 300 days, or about or at least about one year.

Acids in the stable aqueous compositions of the present disclosure may include but are not limited to multidentate organic acids including citric acid, glutamic acid, and combinations thereof, as well as inorganic acids such as sulfuric acid ($H_2SO_4$).

Multidentate organic acids such as citric acid may function to chelate the micronutrients and may be present at about 5.0 to 15.0 wt %, about 8.0 to 10.0 wt %, about 8.5 wt % to about 9.5 wt %, or about 9.0 wt % of the composition. For instance, citric acid is a multidentate ligand which may form stable complexes with various metal ions and transition metals.

Inorganic acids such as sulfuric acid ($H_2SO_4$) may function to stabilize the composition or components thereof and may be present at about 3.0 to 10.0 wt %, about 4.0 to 8.0 wt %, about 4.0 to 7.0 wt %, or about 5.0 to 7.0 wt % of the composition. Sulfuric acid may facilitate making available zinc in the compositions when the zinc in the composition is derived from zinc oxide (ZnO). Surprisingly, it has been found that while sulfuric acid serves as a lixivant in metallurgy, its presence in certain compositions of the present disclosure in combination with citric acid may facilitate extracting zinc from the zinc oxide making the zinc ions more available and loosely bound from its oxide state and more available for plant uptake.

Organic amines in the compositions of the present disclosure may also function to chelate the micronutrients and/or stabilize the composition. Organic amines may include but are not limited to amino alcohols such as monoethanolamine (MEA), diethanolamine (DEA), and triethanolamine (TEA). Amino alcohols may be present at about 10.0 to 25.0 wt % of the composition. For instance, MEA may be present at about 10 to 20 wt %, about 12 to 16 wt %, or at about 15 wt % of the composition. TEA may be present at about 1.0 to 5.0 wt %, about 2.0 to 3.0 wt %, or at about 2.5 wt % of the composition.

For chelation of the micronutrients, a combination of an organic acid (e.g., citric acid or zinc citrate), MEA, and/or TEA may chelate the micronutrients, thereby preventing the micronutrient from precipitating with components contained within the composition or with admixed compositions containing components capable of precipitating with the micronutrients, such as phosphate and/or trace impurities in pesticides. The chelators may be present in an amount sufficient to chelate with the micronutrients and may be provided in the quantities disclosed herein. In some implementations, TEA in particular may facilitate chelation in compositions containing manganese. In further implementations the disclosed compositions may be free of certain chelators such as glutamic acid and ethylenediaminetetraacetic acid (EDTA)

Compositions including chelated micronutrients are disclosed in U.S. Pat. No. 9,908,821 B2 entitled "Micronutrient Compositions And Systems And Methods Of Using Same" and granted on Mar. 6, 2018 and U.S. Pat. No. 9,938,201 B1 entitled "Micronutrient Compositions Containing Zinc And Systems And Methods Of Using Same" and granted on Apr. 10, 2018, which are incorporated herein by reference in its entirety for any useful purpose.

Crystal inhibitors of the present disclosure may function to stabilize the compositions and maintain the micronutrients in solution in a non-precipitated state. Crystal inhibitors may include saccharides, such as monosaccharaides, disaccharides, polysaccharides, oligosaccharides and combinations thereof. For instance, monosaccharaide crystal inhibitors may include fructose, glucose and combinations thereof. An exemplary product containing saccharides that may serve to inhibit crystallization in the compositions of the present disclosure includes Iso Clear®. Saccharides may be present at levels of about 1.0 to 5.0, about 2.0 to about 5.0, about 2.0 to about 4.0, about 2.0 to about 3.0 wt % of the composition.

Other crystal inhibitors in the composition may include alkylpolyglucoside (APG) and may be in combination with the saccharides. APG may be present in the composition at levels of about 0.5 to about 2.5, about 0.5 to about 2.0 about 1.0 to about 2.0, or from at least 0.01 up to about 3.0 wt %. Exemplary products containing APG that may serve to inhibit crystallization in the compositions of the present disclosure includes Agnique® AU641, Agnique® PG8105, and Agnique PG9116.

The compositions of the present disclosure may have a pH that ranges from about 6.0 to about 9.0, about 6.0 to about 7.0, about 6.0 to 6.5, or up to 6.5 or 7.0. These ranges may provide an acidic or a slightly acidic pH to the compositions. For instance, organic acids, such as citric acid, may provide acidity to the composition, while simultaneously chelating with the micronutrients. Sulfuric acid may also provide acidity to the composition while functioning as a stabilizer.

Water in the composition functions as the medium in which the components of the composition are present and may be present in the composition at levels of about 25 to about 40, about 30 to 40, about 25 to about 35, about 35 to 40 wt % of the composition.

Inert components, such as surfactant additives, may include but are not limited to: ethanol (EtOH) isopropyl alcohol (IPA), propylene glycol (PG), and a poly-siloxane foam retardant (Si). These inert components may be carriers, nonfunctioning agents or formulation aids, e.g., for reducing the freezing temperature. The inert components may be present in a range from about 0.1 to about 5 wt %, about 0.1 to about 4.5 wt %, about 1 to about 3 wt %, about 1 to about 2 wt %, or about 2 wt % of the composition. Other inert components may include anti-foaming agents or defoamers, which may be present in the composition and may include but are not limited to silicone-based defoamers (e.g., TA030) or methylated seed oil-containing defoamers. Butylated hydroxytoluene (BHT) may facilitate improving stability by reducing oxidative stress on the formula Compositions containing modified vegetable oil, polyoxyethylene sorbitan fatty acid ester, and vegetable oil such as InterLock® may function as an antifoam and spray adjuvant to improve spray to avoid increased fines when combined with dicamba for example. These components may be present in a range from about 0.01 to about 0.5 wt %, or about 0.1 wt % of the composition. Antimicrobials, another inert component, may be present in the composition and may include but are not limited to 1,2-benzisothiazolin-3-one in dipropylene glycol—antimicrobial (e.g., Proxel™ GXL, available from Arch Biocides of Smyrna, Ga.). These components may be present in a range from about 0.01 to about 0.1 wt %, or up to about 0.1 wt % of the composition.

The compositions of the present disclosure may be free of the disclosed components, as well as free of potentially harmful additives such as glycerol and/or propylene glycol, which may destabilize the compositions causing them to gel.

Compatibility

The compositions of the present disclosure may be admixed with a number of agricultural chemicals while remaining stable, non-precipitated over extended periods of time such as at least about 30 days, 60 days, 100 days, 200 days, or 300 days, or about or at least about one year due to the acid and the organic amine chelating with the micronutrients in the composition to thereby prevent the formation of insoluble solids with components of the agricultural chemicals.

Agricultural chemicals include but are not limited to plant nutrients including fertilizers and macronutrients, pesticides, surfactants, adjuvants, and other agricultural chemicals that may otherwise be capable of precipitating with the micronutrients in the absence of the stable aqueous compositions of the present disclosure. For instance, a number of plant nutrients may be compatible with the compositions of the present disclosure. Plant nutrients may include but are not limited to: sulfur, boron, manganese, zinc, calcium, magnesium, and copper. Non-limiting exemplary products containing plant nutrients include for instance: MAX-IN® Sulfur; MAX-IN® Boron; MAX-IN® Ultra Manganese; Brandt® Smart Mn Plus; MAX-IN® Zinc; MAX-IN® Calcium; MAX-IN® Magnesium; MAX-IN® Vine and Veg; MAX-IN® Copper; MAX-IN® Beans; N—P—K fertilizers, N—P—K fertilizers with micronutrient supplements such as boron and potassium, Gradual N® 25-0-0-0.5; Gradual N® 30-0-0; Gainer™ 10-52-10; Gainer™ 10-16-38; Gainer™ 0-50-30; Gainer™ High K. The plant nutrients may each be applied at a rate of about 4 oz/acre to about 5 lbs/acre or about 0.5 qt/acre to 8 qt/acre.

A number of pesticides, e.g., herbicides, insecticides and/or fungicides, may be compatible with the stable aqueous compositions of the present disclosure. Such herbicides may include but are not limited to: N-(phosphonomethyl) glycine, e.g., glyphosate, in various forms including in the form of a salt, ester or other derivative thereof. Examples of glyphosate products include but are not limited to: its form as a potassium salt (e.g., Roundup PowerMax®), as a dimethylamine salt (e.g., Durango® DMA®), in its form as an isopropylamine salt (e.g., CornerStone® Plus), and glyphosate in combination with other pesticides such as 2,4-Dichlorophenoxyacetic acid (2,4-D) (e.g., Enlist Duo®) and with dicamba.

Other non-limiting exemplary pesticides that may be compatible with the compositions of the present disclosure include for instance: glufosinate, 2,4-Dichlorophenoxyacetic acid (2,4-D), dicamba, Atrazine (1-Chloro-3-ethyl-amino-5-isopropylamino-2,4,6-triazine); Callisto®, Diflexx® Duo (Dicamba, Tembotrione); Engenia®; Enlist One®; Lumax® EZ; Liberty®; XtendiMax®; Headline AMP® (pyraclostrobin, metconazole); Quilt Xcel®; Trivapro®; Avalanche® Ultra; Cobra®; Flexstar®; Revysol®; Cleanse®; and combinations of two or more thereof. One or more of the pesticides may each be applied at a rate of about 2 oz/acre to about 210 oz/acre.

Non-ionic surfactants may be included in the agricultural spray, and non-limiting exemplary products may include Class Act® NG® and Preference®. Water conditioners may include products such as Class Act® Ridion. High surfactant crop oil concentrate (HSOC-COC) may be included in the agricultural spray, for instance for use with glyphosate herbicides, and non-limiting exemplary products may include Superb® HC.

Spray adjuvants may be included in the agricultural spray such as surfactants including On Target® which may function to avoid increased fines when combined with dicamba for example.

Uses

The compositions of the present disclosure may be applied in agricultural spray applications such as to seed, soil, foliage and fruit. Sprays containing the disclosed compositions may be delivered using ground and aerial spray applications. Application may be during the vegetative state and may range from v3 to v18 and during the early reproductive stages VT/R1. In addition or alternatively, the composition may be applied during or after planting to promote the growth of the plant root system.

Prior to use, the disclosed compositions may be mixed with, for instance, water, water conditioners, pesticides, antimicrobial compositions, and inert components described herein such as formulation aids (e.g., propylene glycol) and surfactants (e.g., cationic, anionic and/or nonionic surfactants). Admixing may be conducted under agitation. In addition or alternatively, admixing may take place at ambient temperatures, e.g., about 70 to 90° F. depending on climate, or may take place under elevated temperatures above 90° F. Admixtures containing the composition and a herbicide may have a pH below 6.5, and preferably in the pH range of about 5 to about 6.

Uptake of the chelated micronutrients present in the compositions by seed, soil, foliage and fruit may facilitate improving growth of plants that are nutrient deficient, and uptake may be improved compared to prior approaches in which unchelated micronutrients are applied. For instance, when applied to growing plants, the plants readily uptake the chelated micronutrients when applied at rates of 32 oz. and 64 oz. per acre. In addition, the compositions of the present disclosure are compatible with herbicides such that when admixed with a herbicide and applied to herbicide-resistant plants, the plants readily uptake the chelated micronutrients while enabling the herbicide to simultaneously control weeds. Particularly the chelated micronutrients do not antagonize herbicides, when enables producers to make fewer spraying passes in fields. As compared to an application of unchelated micronutrients, the uptake of chelated micronutrients is relatively improved. Further, the compositions of the present disclosure are compatible with the disclosed plant nutrients, herbicides and other agricultural compositions, which enables the compositions to be safely admixed with these agricultural compositions while avoiding precipitation of the micronutrients, which could otherwise clog spray equipment, e.g., spray nozzles.

EXAMPLES

The following stability testing examples illustrate various aspects of the disclosure and should not be considered limiting.

Materials and Methods:

The apparatuses used in the stability testing included: a graduated jar, 120 mL; a flashlight; an oven, controlled to a specified temperature (±2° C.); and a refrigerator/freezer controlled to a specified temperature (±2° C.).

The freeze/thaw stability testing procedure involved transferring an amount of product into a graduated jar; placing the jar into the freezer at −18° C.±2° C.; after 24 hours, the sample was taken out of the freezer and allowed to come to room temperature; upon reaching room temperature, the product had undergone one cycle. The sample was subjected to five (5) total cycles.

Freeze/thaw evaluation was conducted after each cycle and observations were taken for any disruption in product formulation including but not limited to, phasing, creaming, settling, crystal growth, precipitation, changes in color, and/or discoloration of container. A flashlight was used to observe darker formulations. If changes in formulation were noticed, numbers of inversions required to get product homogenous was be recorded. If inversion of the product did not homogenize product, the test was considered a fail.

Using refrigeration to test stability involved transferring product into a graduated jar; placing the jar into a refrigerator at 0° C.±2° C.; and checking for any change every day for four weeks. After the four week period, the product was checked once a week. The product was tested for three months.

Stability evaluation for refrigeration was conducted each time the product was checked, and observations were taken and recorded according the method described in connection with the freeze/thaw evaluation.

Testing stability under elevated temperatures involved using an oven. An amount of product was transferred into a graduated jar and placed into an oven at 54° C.±2° C. The product was checked for any change every day for four weeks. After four weeks, the product was checked once a week. The product was allowed to stay in the oven for 3 months.

Stability evaluation under elevated temperature was conducted each time the product was checked, and observations were taken and recorded according the method described in connection with the freeze/thaw evaluation.

Ambient temperature stability evaluation at room temperature was conducted in which the samples were stored at room temperature at approximately 22-25±2° C. and observing the sample on a weekly basis to determine stability of the product.

Stability evaluation at ambient temperature was conducted each time the product was checked, and observations were taken and recorded according the method described in connection with the freeze/thaw evaluation.

Example 1

In some implementations, the agricultural admixture of the present disclosure may include the admixture of Table 1 in combination with one or more of crystal inhibitors including a saccharide and/or an alkylpolyglucoside, for instance, as reflected in Table 2.

TABLE 1

Admixture 1

| | Wt % | Element purity % | Element content % |
|---|---|---|---|
| Water | 39.7% | | |
| Zinc Oxide (ZnO) | 5.3% | 80.34% | 4.27% (Zn) |
| Manganese Sulfate (MnSO₄) | 10.7% | 36.38% | 3.87% (Mn) |
| Boric Acid | 12.0% | 17.48% | 2.09% (B) |
| Citric Acid | 9.6% | | |
| Triethanolamine (TEA) | 2.5% | | |
| Monoethanolamine (MEA) | 14.8% | | |
| Sulfuric Acid (H₂SO₄) | 5.5% | | |
| Total | 100% | | |

Stability testing was performed on Admixture 1 as well as various compositions containing Admixture 1. In Table 2, the compositions of Run 1 were tested upon production, and the compositions of Run 2 involved storing Admixture 1 in a refrigerator environment for at least 30 days prior to stability testing with the various additives (e.g., inert packages). The additives listed in Table 2 were added to the Admixture 1 listed in Table 2 resulting in the amount of components of Admixture 1 being reduced by a corresponding amount additives included in the tested compositions.

TABLE 2

Stability of Admixture 1 alone and in combination with agricultural and stability additives.

| Compositions Tested | Days to Failure Run 1 | Days to Failure Run 2 |
|---|---|---|
| Admixture 1 | 34 | 10 |
| Admixture 1 + 1% Synergen GA (crystal inhibitor) | 34 | |
| Admixture 1 + 1% Triproplyene glycol (wetting agent) | 34 | 38 |
| Admixture 1 + 1% Inhibitor Crystal 5 | 34 | |
| Admixture 1 + 1% Glycerol | 37 | 28 |
| Admixture 1 + 1% Propylene Glycol | | 6 |
| Admixture 1 + 1% Urea Sulfate (82%) | 34 | |
| Admixture 1 + 1% Milcoside(101) (non-ionic surfactant) | 40 | 57 |
| Admixture 1 + 1% APG (Agnique PG8105) | 34 | |
| Admixture 1 + 1% APG | 37 | |
| Admixture 1 + 1% Iso Clear ® | 72 | 57 |
| Admixture 1 + 2.8% Iso Clear ® + 0.9% APG | N/A | N/A |
| Admixture 1 + 2.8% Iso Clear ® + 0.9% APG + 1% Synergen GA | 34 | |
| Admixture 1 + 2.8% Iso Clear ® + 0.9% APG + 1% Glycerol | 58 | 28 |
| Admixture 1 + 2.8% Iso Clear ® + 0.9% APG + 1% Propylene Glycol | | 16 |
| Admixture 1 + 2.8% Iso Clear ® + 0.9% APG + 1% Milcoside(101) | 83 | N/A |
| Admixture 1 + 2.8% Iso Clear ® + 0.9% APG + 1% Triproplyene glycol | N/A | N/A |
| Admixture 1 + 2.8% Iso Clear ® + 0.9% APG + 1% Inhibitor Crystal 5 | N/A | N/A |
| Admixture 1 + 2.8% Iso Clear ® + 1.9% APG | N/A | |
| Admixture 1 + 2.8% Iso Clear ® + 1.4% APG | | N/A |
| Admixture 1 + 2.8% Iso Clear ® + 0.9% APG + 1% Urea Sulfate (82%) | N/A | N/A |
| Admixture 1 + 3.3% Iso Clear ® + 0.9% APG | | N/A |
| Admixture 1 + 3.8% Iso Clear ® + 0.9% APG | N/A | |

Stability Testing Duration = 100 days

As reflected in Table 2 the combination of at least 1% v/v of a saccharide crystal inhibitor (Iso Clear) with Admixture 1 results in a stable agricultural admixture containing the elevated levels of micronutrients for at least 72 days. As further reflected in Table 2, the combination of a saccharide crystal inhibitor (Iso Clear®) with at least 0.9% APG in combination with Admixture 1 results in a stable agricultural mixture for at least 100 days (i.e., N/A in Table 2 indicates the composition tested did not fail during the 100 day stability testing). As also reflected in Table 2, the combination of at least 2.8 wt % of a saccharide with about 0.9 wt % v/v or more of an alkylpolyglucoside (APG) as crystal inhibitors results in a stable agricultural admixture containing elevated levels of micronutrients for over 100 days. The combination of these crystal inhibitors additionally improved the stability of the admixture when combined with non-ionic surfactants (e.g., Milcoside(101)), wetting agents (e.g., triproplyene glycol), other crystal inhibitors (e.g., Inhibitor Crystal 5), and urea sulfate. The compositions in Table 2 exhibited a pH ranging from 5.7-6.1.

While Example 1 includes zinc derived from zinc oxide to provide an elemental content of zinc at about 4.25-4.30 wt %, zinc may be derived from other zinc sources such as zinc citrate.

Example 2

In some implementations, the agricultural admixture of the present disclosure may include the Admixtures 2 and 3 of Table 3 in which zinc citrate provides the elemental source of zinc.

TABLE 3

Admixtures with Zinc Citrate as source of elemental Zn

| | Admixture 2 Wt % | Admixture 3 Wt % | Element purity % | Element content % |
|---|---|---|---|---|
| Water | 33.5% | 37.7% | | |
| Zinc citrate | 13.3% | 12.8% | 31.00% | 4.28%/3.97% (Zn) |
| Manganese Sulfate (MnSO$_4$) | 10.2% | 10.2% | 36.38% | 3.87% (Mn) |
| Boric Acid | 11.5% | 11.5% | 17.48% | 2.09% (B) |
| Triethanolamine (TEA) | 2.4% | 2.4% | | |
| Monoethanolamine (MEA) | 14.2% | 14.2% | | |
| Sulfuric Acid (H$_2$SO$_4$) | 6.8% | 6.8% | | |
| Iso Clear ® (saccharide crystal inhibitor) | 2.8% | 2.8% | | |
| APG | 0.9% | 0.9% | | |
| Inerts | 4.3% | — | | |
| Antifoam | — | 0.05% | | |
| Butylated hydroxytoluene (BHT) | | 0.02% | | |
| Ethanol + InterLock ® | — | 0.5% | | |
| Total | 100% | 100% | | |

Admixture 2 had a pH of about 6.3. Admixture 3 had a pH of about 6.12. Admixture 2 remained stable in solution for at least 60 days, while Admixture 3 remained stable in solution for over 100 days. While Admixture 2 provides beneficial results in stability, the relatively lower amount of zinc and overall lower amount of micronutrients (~0.31%) in Admixture 3 relative to Admixture 2 may be a contributing factor in Admixture 3 remaining stable for over 100 days. The additional BHT in Admixture 3 may serve as a stabilizer by reducing oxidative stress on the formula.

Example 3

In some implementations, the agricultural admixture of the present disclosure may include the admixture of Table 4 in which manganese oxide provides the elemental source of manganese.

TABLE 4

Admixtures 4 and 5 with Manganese Oxide as source of elemental Mn

| | Admixture 4 | | | Admixture 5 | | |
|---|---|---|---|---|---|---|
| Component | Mass % | Element purity % | Element content % | Mass % | Element purity % | Element content % |
| Water | 29.4 | | | 25.1 | | |
| ZnO | 5.2 | 80.34 | 4.46 (Zn) | 5.05 | 80.34 | 4.06 (Zn) |
| MnO | 5.00 | 77.45 | 3.87 (Mn) | 4.91 | 77.45 | 3.80 (Mn) |
| Boric Acid | 12.0 | 17.48 | 2.1 (B) | 12.03 | 17.48 | 2.10 (B) |
| MEA | 20.6 | | | 20.2 | | |
| Citric Acid | 27.7 | | | 26.15 | | |
| Sulfuric Acid (H$_2$SO$_4$) (93%) | n/a | | | 2.5 | | |
| TA030 (defoamer) | n/a | | | .05 | | |

TABLE 4-continued

Admixtures 4 and 5 with Manganese Oxide as source of elemental Mn

| | Admixture 4 | | | Admixture 5 | | |
|---|---|---|---|---|---|---|
| Component | Mass % | Element purity % | Element content % | Mass % | Element purity % | Element content % |
| APG (AU641) | n/a | | | 0.9 | | |
| Iso Clear ® (saccharide crystal inhibitor) | n/a | | | 2.7 | | |
| Interlock ® | n/a | | | 0.5 | | |
| Total | 100% | | | 100% | | |

Admixture 4 had a pH of 8 showed good stability at room temperature after approximately 120 days without any inert package. In some implementations, Admixture 4 may be combined with one or more of crystal inhibitors including a saccharide and/or an alkylpolyglucoside (APG) as in Examples 1 and 2. For instance, Admixture 5 having a pH of 6.2 with the formulation listed in Table 4 includes crystal inhibitors such as Iso Clear® and APG (AU641), which showed good stability at room temperature for at least 30 days (with the stability experiment ongoing at the time of filing this application) along with inert components (i.e., TA030 and Interlock®). In further implementations, Admixtures 4 and 5 may be prepared by adding about 5% of MEA (mass % of each Admixture) after the addition of boric acid to cause the MEA to react with the boric acid and to adjust a pH of the admixture.

Example 4

In some implementations, the agricultural admixture of the present disclosure may include the admixture of Table 5.

TABLE 5

Admixture 6

| Component | Mass % | Element purity % | Element content % |
|---|---|---|---|
| Water | 38 | | |
| ZnO | 5 | 80.34 | 4.02 (Zn) |
| Manganese Sulfate | 10 | 36.68 | 3.67 (Mn) |
| Boric Acid | 12 | 17.48 | 2.1 (B) |
| Citric Acid | 9 | | |
| Sulfuric acid | 5 | | |
| TEA | 2 | | |
| MEA | 14 | | |
| Iso Clear ® (saccharide crystal inhibitor) | 3 | | |
| APG (Agnique PG9116) | 1 | | |
| BHT | 0.02 | | |
| Ethanol | 0.20 | | |

Admixture 6 remained stable at room temperature for over one year.

Although the present disclosure provides references to preferred embodiments, persons skilled in the art will recognize that changes may be made in form and detail without departing from the spirit and scope of the invention.

What is claimed is:

1. An agricultural admixture comprising:

citric acid, an organic amine, boron, zinc and at least one additional micronutrient, in which the boron, the zinc and the at least one additional micronutrient are chelated;

sulfuric acid; and a saccharide, wherein the boron is present in an amount of at least 1.0 wt % of the admixture and the boron is derived from boric acid present in the admixture, wherein the zinc is present in an amount of at least 2.2 wt % of the admixture and the zinc is derived from zinc oxide present in the admixture, wherein the admixture contains a total boron, zinc and at least one additional micronutrient content of at least 7.2 wt %, wherein at least zinc ions in the zinc oxide are made available for uptake by the presence of the citric acid and the sulfuric acid, and wherein the admixture is a solution and remains stable by being non-precipitated for at least 60 days.

2. The admixture of claim 1, wherein the boron is present in an amount of up to 3.0 wt % of the admixture.

3. The admixture of claim 1, wherein the total of the boron, the zinc and the at least one additional micronutrient content is up to about 10.2 wt %.

4. The admixture of claim 1, wherein the at least one additional micronutrient further comprises one or more of manganese, copper, iron, molybdenum, magnesium, or calcium.

5. The admixture of claim 4, wherein the at least one additional micronutrient further comprises two or more of manganese, copper, iron, molybdenum, magnesium, or calcium.

6. The admixture of claim 1, wherein the at least one additional micronutrient further comprises manganese.

7. The admixture of claim 6, wherein the zinc is present at up to 5.0 wt % of the admixture and the manganese is present at about 2.0 to 5.0 wt % of the admixture.

8. The admixture of claim 1, wherein the saccharide comprises one or more monosaccharides, disaccharides, polysaccharides, or oligosaccharides.

9. The admixture of claim 8, wherein the saccharide comprises monosaccharides, the monosaccharides comprising fructose and glucose.

10. The admixture of claim 1, further comprising alkylpolyglucoside.

11. The admixture of claim 1, further comprising glutamic acid, and combinations thereof.

12. The admixture of claim 1, wherein the organic amine comprises an amino alcohol.

13. The admixture of claim 12, wherein the amino alcohol comprises one or more of monoethanolamine, diethanolamine, or triethanolamine.

14. The admixture of claim 1, further comprising a defoamer.

15. A method of spraying an agricultural admixture, comprising:

admixing an admixture comprising citric acid, an organic amine, boron, zinc, at least one additional micronutrient, sulfuric acid, and a saccharide with a pesticide; and spraying the admixture, wherein the citric acid and the organic amine chelate with the boron, the zinc and the at least one additional micronutrient to thereby prevent the boron, the zinc and the at least one additional micronutrient from forming an insoluble solid, wherein the boron is present in an amount of at least 1.0 wt % of the admixture and the boron is derived from boric acid present in the admixture, wherein the zinc is present in an amount of at least 2.2 wt % of the admixture and the zinc is derived from zinc oxide present in the admixture, and wherein the admixture contains a total boron, zinc and at least one additional micronutrient content of at least 7.2 wt %, wherein at least zinc ions in the zinc oxide are made available for uptake by the presence of the citric acid and the sulfuric acid, and wherein the admixture is a solution and remains stable by being non-precipitated for at least 60 days.

16. The method of claim 15, wherein the pesticide comprises one or more of 2,4-Dichlorophenoxyacetic acid, glyphosate, glufosinate, and dicamba.

17. A method of producing an agricultural admixture, comprising:

admixing an admixture of citric acid, an organic amine, boron, zinc, at least one additional micronutrient, sulfuric acid, and a saccharide with one or more agricultural chemicals, wherein the boron is present in an amount of at least 1.0 wt % of the admixture and the boron is derived from boric acid present in the admixture, wherein the zinc is present in an amount of at least 2.2 wt % of the admixture and the zinc is derived from zinc oxide present in the admixture, and wherein the agricultural admixture contains a total boron, zinc and at least one additional micronutrient content of at least 7.2 wt %, wherein the citric acid and the organic amine chelate with the boron, the zinc and the at least one additional micronutrient to thereby prevent the boron, the zinc and the at least one additional micronutrient from forming an insoluble solid, wherein at least zinc ions in the zinc oxide are made available for uptake by the presence of the citric acid and the sulfuric acid, and wherein the admixture is a solution and remains stable by being non-precipitated for at least 60 days.

18. The method of claim 17, wherein the agricultural chemicals comprise at least one of:

one or more pesticides;

one or more fertilizers;

one or more adjuvants; or one or more chemicals capable of precipitating with the boron, the zinc and the at least one additional micronutrient in the absence of the citric acid and the organic amine.

* * * * *